United States Patent [19]

Hubble et al.

[11] 4,081,522

[45] Mar. 28, 1978

[54] REGENERATION OF SULFATED METAL OXIDES AND CARBONATES

[75] Inventors: Bill R. Hubble, Plainfield; Stanley Siegel, Downers Grove; Paul T. Cunningham, Naperville, all of Ill.

[73] Assignee: The United States of America as represented by the United States Department of Energy, Washington, D.C.

[21] Appl. No.: 730,751

[22] Filed: Oct. 7, 1976

[51] Int. Cl.² ............... C01B 17/42; B01J 17/00
[52] U.S. Cl. ................... 423/542; 423/170; 423/244; 423/555; 423/638
[58] Field of Search ............... 423/555, 541, 539, 244, 423/171, 170, 168, 638, 542, 566

[56] References Cited

U.S. PATENT DOCUMENTS

| | | | |
|---|---|---|---|
| 3,260,035 | 6/1966 | Wheelock et al. | 423/541 |
| 3,582,276 | 6/1971 | Campbell et al. | 423/539 |
| 3,640,682 | 2/1972 | Smith et al. | 423/566 |
| 3,726,957 | 4/1973 | Lind | 423/170 |
| 3,729,551 | 4/1973 | Gorin | 423/168 |

OTHER PUBLICATIONS

Hoke et al. A Regenerative Limestone Process for Fluidized Bed Coal Combustion and Desulfurization, NTIS PB 231 374, Springfield UA Jan. 74, pp. 1a, 1b, 16-21, 66-89.

*Primary Examiner*—O. R. Vertiz
*Assistant Examiner*—Gary P. Straub
*Attorney, Agent, or Firm*—Dean E. Carlson; Frank H. Jackson; Hugh W. Glenn

[57] ABSTRACT

Alkali metal or alkaline earth metal carbonates such as calcium carbonate and magnesium carbonate found in dolomite or limestone are employed for removal of sulfur dioxide from combustion exhaust gases. The sulfated carbonates are regenerated to oxides through use of a solid-solid reaction, particularly calcium sulfide with calcium sulfate to form calcium oxide and sulfur dioxide gas. The regeneration is performed by contacting the sulfated material with a reductant gas such as hydrogen within an inert diluent to produce calcium sulfide in mixture with the sulfate under process conditions selected to permit the sulfide-sulfate, solid-state reaction to occur.

5 Claims, 3 Drawing Figures

CaSO₄—CaS REACTION FOR 1.1 CaSO₄/CaS MOLE RATIO MATERIAL.

CaSO4-CaS REACTION IN MATERIAL PREPARED AT 900°C WITH 4 VOL. % H2.

CaSO4—CaS REACTION FOR 1.1 CaSO4/CaS MOLE RATIO MATERIAL.

CaSO4/CaS REACTION IN MATERIAL PREPARED AT 750°C WITH 6% H2 BY VOLUME

REGENERATION OF SULFATED METAL OXIDES AND CARBONATES

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates to a method of regenerating sulfated metal carbonates or oxides particularly those of calcium that have been sulfated in the removal of sulfur dioxide from combustion exhaust gases.

In the fluidized bed combustion of coal, as well as the combustion of other sulfur-bearing fuels objectionable sulfur oxide gases are emitted with the exhaust. These oxides of sulfur are sorbed into alkaline earth metal or alkali metal carbonates or the corresponding oxides, produced by calcination within the combustion process.

Synthetic sorbents such as calcium oxide impregnated within a porous substrate of, for instance, alumina have been considered for removal of sulfur oxide gases. Such synthetic sorbents are described in copending U.S. patent application to Vogel et al. entitled "A Method Of Removing Sulfur Emissions From A Fluidized Bed Combustion Process", Ser. No. 684,419, filed May 7, 1976.

For environmental and economic reasons, a clear need exists for a regeneration process that will permit the cyclic use of the sorbent material and an efficient recovery of sulfur in an usable or storable form. Two regeneration processes are currently receiving considerable attention. The first is a two-step approach described by equations 1 and 2, $$CaSO_4 + 4H_2(4CO) \rightarrow CaS + 4H_2O(4CO_2) \quad (1)$$

$$CaS + CO_2 + H_2O \rightarrow CaCO_3 + H_2S \quad (2)$$

Regeneration based on these reactions can be carried out at moderate temperatures of about 800° C. to 900° C. for reaction (1) and about 500° C. to 600° C. for reaction (2). Elevated pressures of 8–10 atm. are required in order to obtain acceptable levels of regeneration. Even with these conditions only 50 to 60% completion in the regeneration of the sulfated calcium to calcium oxide has been obtained.

Another contemplated regeneration scheme is a one-step decomposition.

$$CaSO_4 + H_2(CO) \rightarrow CaO + H_2O(CO_2) + SO_2 \quad (3)$$

This reaction has been found to proceed to an acceptable 70% regeneration of the sulfated calcium and at atmospheric pressure but must be carried out at elevated temperatures of about 1100° C. Process temperatures of such a high level are extremely undesirable due to the severe penalties resulting from increased corrosion and loss in material strength.

The reaction of the present development has been used previously as a method of producing $SO_2$ in sulfuric acid processes. In such processes the reactants are provided in powdered form to achieve good mixture. However, it has not been seriously considered as a means of regenerating sulfated calcium oxides as it involves a solid-solid reaction which was thought to be difficult to carry out to a sufficient degree of completion within relatively large particles instead of blended powders. The reaction is as follows $$3CaSO_4 + CaS \rightarrow 4CaO + 4SO_2 \quad (4)$$

Prior workers, having felt this reaction occurred to only a small extent, also believed the formation of calcium sulfide to be undesirable when carrying out the regeneration reaction given in equation (3) above, Combustion, Vol. 46/No. 7, "Combustion and Desulfurization of Coal in a Fluidized Bed of Limestone", page 10, January 1975; also see "Reduction of Atmospheric Pollution by the Application of Fluidized-Bed Combustion and Regeneration of Sulfur-Containing Additives", Annual Report July '71 – June '72, ANL/ES-CEN-1005, P. 43, Argonne National Laboratory.

SUMMARY OF THE INVENTION

Therefore, in view of these disadvantages of prior art regeneration processes, it is an object of the present invention to provide a process for the regeneration of sulfated metal oxides in which metal sulfides and metal sulfates react in solid form to produce metal oxides and sulfur dioxide gas.

It is a further object to provide a process for the regeneration of calcium oxide after its sulfation at more moderate temperature but with increased regeneration yield over prior processes.

It is also an object to provide a process in which a sufficiently intimate mixture of calcium sulfide and calcium sulfate within solid particles can be provided to permit good good regeneration of sulfate to oxide.

In accordance with the present invention a process is provided for the regeneration of sulfated metal oxides in which solid particles containing metal sulfate and metal oxide are contacted with a reductant gas to produce an intimate mixture of metal sulfides and metal sulfates within the particles. The particles are then heated to react the metal sulfide with the metal sulfate within the solid particles and produce sulfur dioxide gas and a regenerated metal oxide.

The process is particularly applicable to the regeneration of sulfated calcium oxide produced when limestone or dolomite is employed for the removal of sulfur dioxide gas from combustion processes. The novel method can be carried out either as two separate steps at different temperatures with the reductant gas contacting the particles only at the lower temperature or as a simultaneous reaction in which the concentration of the reductant gas and the process temperature are maintained at levels such that the reaction with the metal sulfate to form metal sulfide is not at a substantially greater rate than the reaction of the product metal sulfide with the remaining metal sulfate to form metal oxide and sulfur dioxide gas.

DETAILED DESCRIPTION OF THE DRAWINGS

Figure 1:
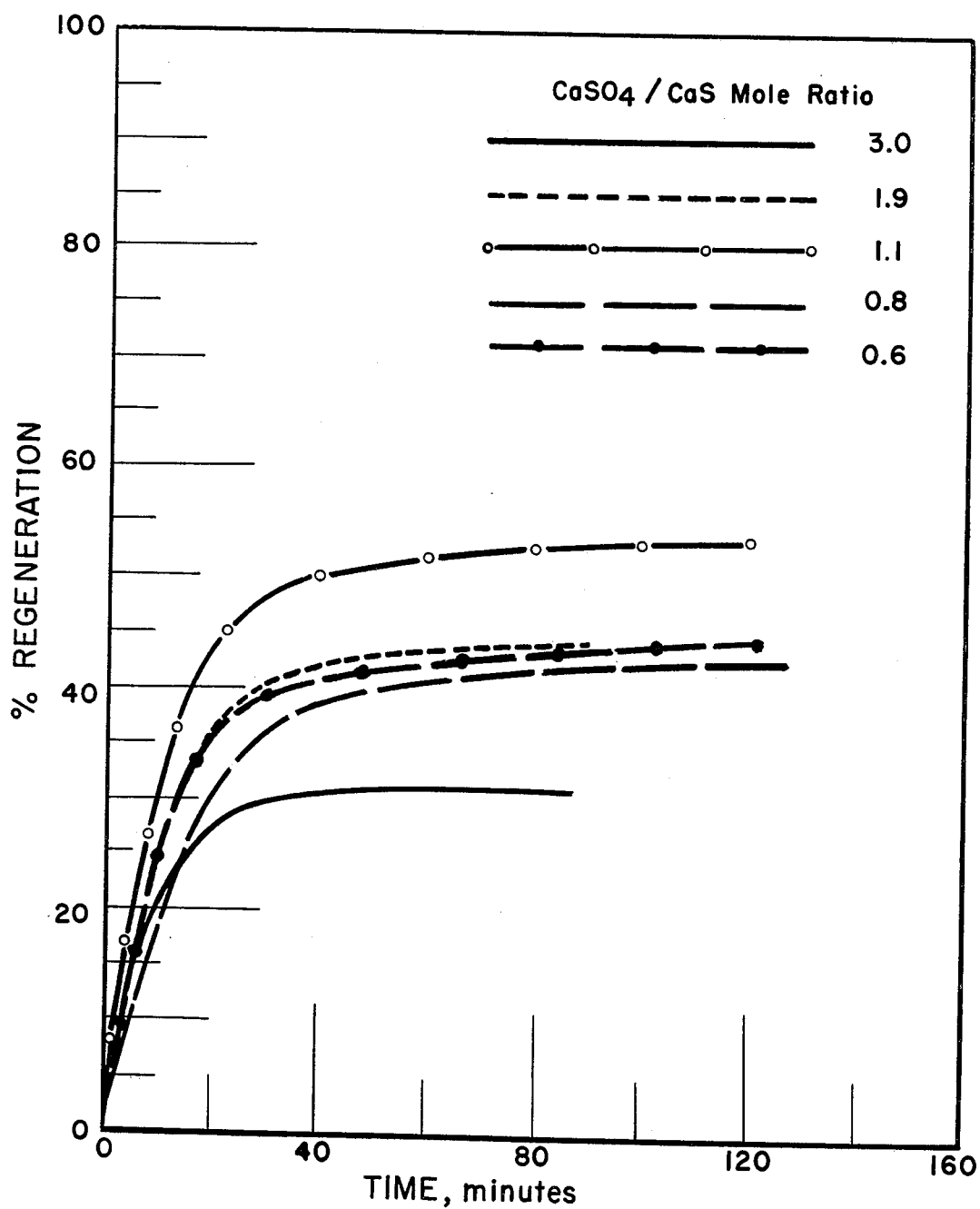

The unexpected improvement attributed to the present invention is illustrated by the accompanying drawings wherein FIG. 1 is a graph of percent regeneration of sulfated calcium oxide particles versus reaction time at 950° C. for sulfated particles that have been contacted previously with 4% by volume hydrogen gas at 900° C. to provide the listed sulfate to sulfide mole ratios.

Figure 2:
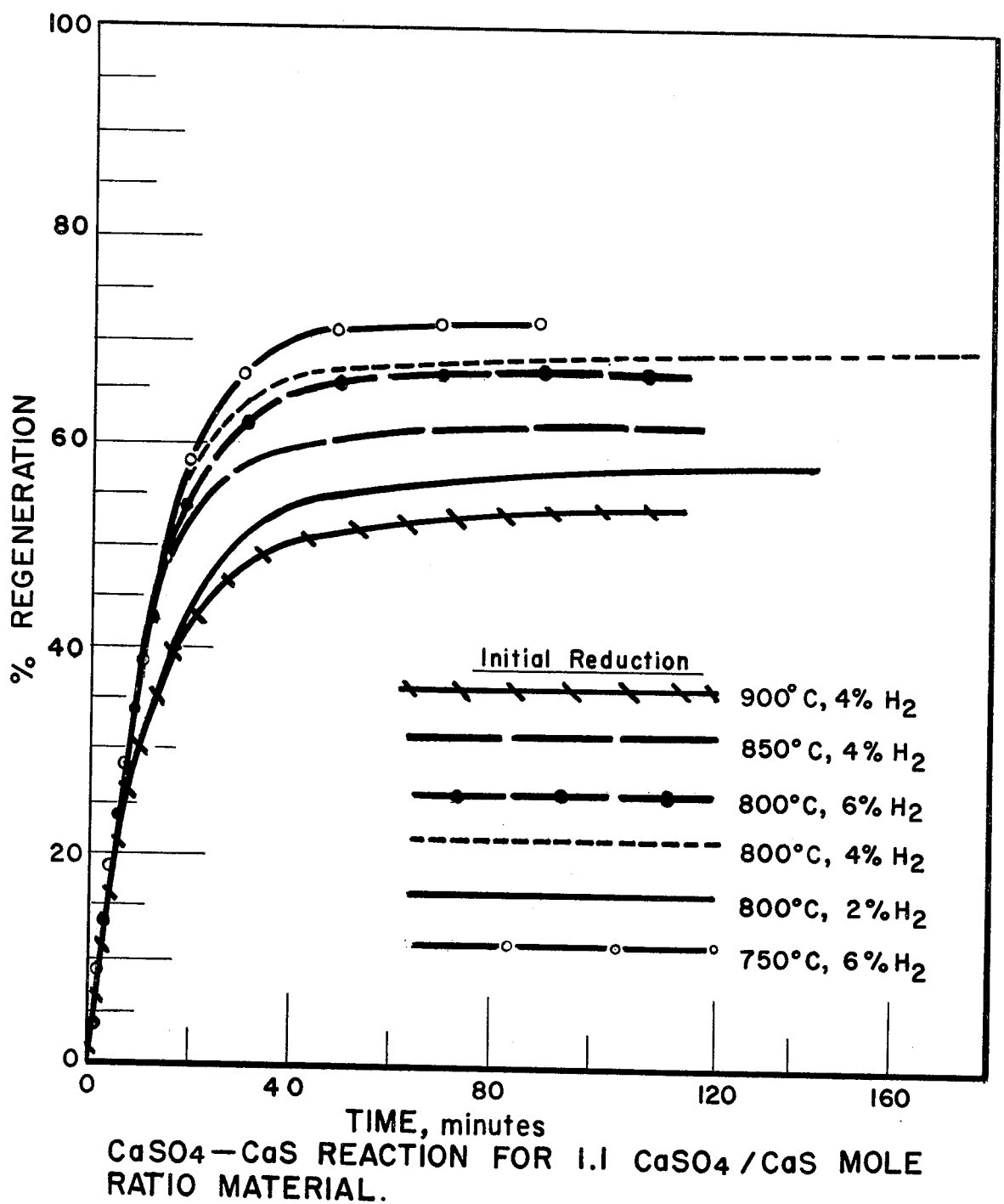

FIG. 2 is a graph showing percent regeneration of sulfated calcium particles versus reaction time at 950°

C. for various sulfated samples which were previously contacted with hydrogen gas at the listed conditions.

Figure 3:
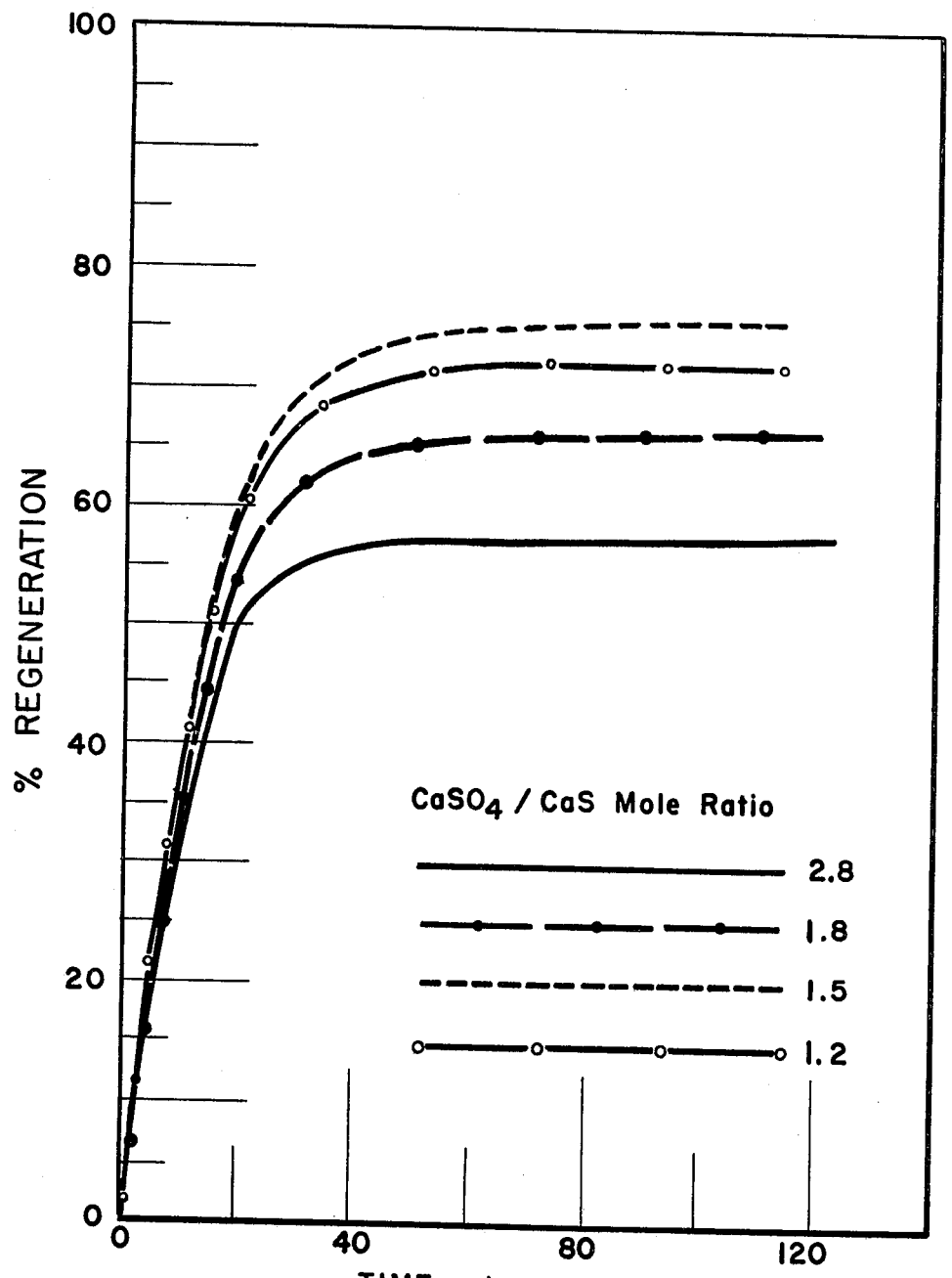

FIG. 3 is a graph showing percent regeneration of the sulfated calcium particles versus reaction time at 950° C. for sulfated calcium samples that have been contacted previously with 6% by volume hydrogen gas at 750° C. to provide the listed sulfate to sulfide mole ratios.

DETAILED DESCRIPTION OF THE PREFERRED EMBODIMENTS

In carrying out the method of the present invention, particles of sulfated metal oxide are obtained from a combustion process in which the oxide or a metal carbonate is used as a sorbent material for oxides of sulfur. Typically dolomite or limestone is used in the fluidized bed combustion of fossil fuels, as the sorbent material. These materials include calcium carbonate and magnesium carbonate which are calcined to the corresponding oxides within the high-temperature bed.

Other sorbents have been proposed such as porous substrates impregnated with alkali metal or alkaline earth metal oxides, e.g. calcium oxide, magnesium oxide and sodium oxide, and potassium oxide as are described in the above cited patent application to Vogel et al., and in Argonne National Laboratory Annual Report on "A Development Program of Pressurized Fluidized-Bed Combustion", pp. 37 – 39, ANL/ES CEN-1011, 1975.

Complete sulfation of the particles may not occur. This is especially true in the case of limestone or dolomite where an outer hull of calcium sulfate has been found to result in individual particles. The particle cores remain as calcium oxide, magnesium oxide or both.

When such particles are regenerated in accordance with the present invention, they are initially contacted with a reductant gas. Gases such as hydrogen or carbon monoxide have been found to be suitable reductants. Other reductant gases such as methane can also be employed to reduce calcium sulfate to calcium sulfide. These reductant gases can be provided within an inert, diluent gas such as nitrogen, helium, or another inert gas which will not react with the process constituents.

It has been found that the solid-solid reduction of calcium sulfate with calcium sulfide will occur with good yield of calcium oxide if physical contact between the starting materials is obtained. Through use of selected conditions in the initial reduction of calcium sulfate with reductant gas, the resulting particles have been found to include irregular regions of intimately mixed calcium sulfate and calcium sulfide crystallites. Optical microscopic studies of such partially reduced samples have revealed these regions in which the solid reactants are in physical contact, see a report of the inventors' work in *APCA Journal,* Vol. 25, No. 12, pp. 1256-57, Dec. 1975.

In order to provide a good distribution of intimate mixtures of calcium sulfide and calcium sulfate within the particles, the parameters of the initial reduction in respect to temperature, reductant gas concentration within diluent gas, and the resulting mole ratios of sulfate to sulfide within the partially reduced particles are of important consideration. It is necessary to control this initial reduction reaction in order to provide sufficient calcium sulfide in contact with the nonreacted calcium sulfate.

The stoichiometry of reaction (4) presented in the Background of the Invention suggests a sulfate to sulfide mole ratio of 3 to maximize the yield of the regenerated calcium oxide. However, the data presented in FIG. 1 indicates that lower mole ratios provide improved regeneration. FIG. 1 shows the percent regeneration of the calcium sulfur within sulfated dolomite initially reduced at 900° C. with a 4% by volume hydrogen in helium mixture at 1 atmosphere pressure. After the partial reduction of calcium sulfate to calcium sulfide with $H_2$ gas, the samples of FIG. 1 were heated at 950° C. substantially without contact with the reductant gas for the period of time indicated. It is seen that the maximum regeneration was obtained with a sulfate to sulfide ratio of 1.1 and that the expected stoichiometric sulfate to sulfide ratio of 3 provided the poorest performance recorded in FIG. 1.

In FIG. 2 other samples of sulfated dolomite are illustrated with the initial, partial reduction of sulfate to sulfide performed at different temperatures between 750° and 900° C. and at various hydrogen gas concentrations within helium diluent. The subsequent solid-solid regeneration reaction was performed by heating the partially reduced sample at 950° C. in the absence of the reductant for the time indicated in FIG. 2. The initial reductions in each case is performed for a sufficient period of time to obtain 1.1 mole ratio of sulfate to sulfide. At the lower temperatures of 750°–800° C. the initial reduction proceeds at a relatively slow rate such that about 350 to 150 minutes are required for this initial gas solid reaction. These reaction rates can be increased somewhat through use of the higher e.g. 6 or more volume % hydrogen in the inert diluent.

It is seen from the curves of FIG. 2 that, unexpectedly, the higher regeneration yields are obtained at the lower initial reaction temperatures. With the initial gas-solid reduction being performed at 750° C. and 6% hydrogen gas concentration about 72% regeneration is obtained after about 60 minutes of maintaining the partially reduced solids at 950° C. Initial reduction temperatures lower than 750° C. coupled with an increase in the reductant gas concentration to over 6% by volume may lead to further improvement in regeneration yield. Therefore it is reasonable to assume that initial reduction temperatures of between 700°–800° C. can be advantageously employed with reductant gas concentrations of about 2 to 8% by volume.

FIG. 3 shows the results of varying the sulfate to sulfide mole ratio in the partially reduced samples of sulfated dolomite when the initial reduction is performed at 750° C. with 6% by volume hydrogen gas. The subsequent solid-solid reaction is accomplished as before by heating the particles to about 950° C. without contact with the reductant gas. It is seen from FIG. 3 that a maximum regeneration of about 75% is obtained when the initial reduction is performed at about 1.5 mole ratio of sulfate to sulfide. Such an initial reaction requires about 320 minutes to accomplish. Therefore, it appears from FIGS. 2 and 3 that the initial reduction reaction should be continued for sufficient time to provide a sulfate to sulfide ratio of about 1.0 to 2.0 with a preferable ratio of about 1.5. All of the results obtained within this range for the initial reduction have exceeded the percent regeneration obtained with a sulfate to sulfide mole ratio of 3.

In one other manner of performing the method of the present invention, the sulfated material is reduced with a reductant gas flow while the solid-solid, $CaSO_4$ - $CaS$ reaction proceeds. It has been found that the equilibrium of these two reactions must be balanced such that too much of the $CaSO_4$ does not reduce to $CaS$ prior to reaction of the latter with the remaining $CaSO_4$. This is accomplished by employing a sufficiently low concentration of reductant gas in diluent gas, e.g. nitrogen or helium, at the reaction temperature to provide CaS as needed to react with the $CaSO_4$.

Table I presents results of the simultaneous gas solid and solid-solid reduction reaction at 950° C. The calcium constituents are presented as a weight percentage of maximum, that is as a percentage of the maximum weight of a calcium species that could be present if all of the calcium were combined as such. This table shows fair conversion of $CaSO_4$ to CaO only for reductant gas concentrations at or below about 0.1 volume percent.

TABLE I

| Reducing Gas % By Vol. | Approx. Reaction Time, hr | Stone Composition-X-Ray Diffraction Results | | |
|---|---|---|---|---|
| | | % Max. Wt. of CaO | % Max. Wt. of $CaSO_4$ | % Max. Wt. of CaS |
| 0 | 0 | 17[a] | 90[a] | 0 |
| 2.0 $H_2$ in He | ⅔ | 33 | 0 | 40 |
| 1.1 $H_2$ in He | 1 | 29 | 0 | 51 |
| 0.58 $H_2$ in He | 3 | 32 | 0 | 51 |
| 0.10 $H_2$ in He | 4 | 49 | 0 | 38 |
| 0.10 CO in $N_2$ | 2 | 49 | 0 | 25 |
| 0.04 $H_2$ in He | 7 | 50 | 0 | 23 |
| 0.01 $H_2$ in He | 21 | 61 | 0 | 17 |
| 0.006 $H_2$ in He | 20 | 54 | 0 | 20 |
| 0.01 $H_2$ in He | 24 | 80 | 0 | 7 |

[a]Starting material for remaining experiments described in Table.

From Table I it is seen that at a reaction temperature of about 950° C. that the simultaneous reduction and solid-solid reactions should be performed with a reductant gas concentration not more than 0.1 volume percent. It will also be clear that since the solid-solid $CaSO_4$-CaS reaction is favored with an excess of CaS, that an initial reduction at a lower temperature, e.g. 750° C., with 2-8% volume reductant, can be performed to produce some CaS followed by a period of simultaneous reactions at about 900°-1000° C. and a low (0.1 vol. % or less) reductant gas concentration.

The following Examples are submitted in order to further illustrate the method of the present invention.

EXAMPLE I

Stones of BCR 1337 dolomite which had an empirical formula $Ca_{1.14}Mg_{0.86}(CO_3)_2$ with average particle size of about 700 micrometers and a distribution of about 100-1500 micrometers are incorporated in a fluidized bed combustion process burning bituminous coal. The stones are calcined and react with emitted sulfur dioxide gases within the process to form outer stone layers of $CaSO_4$·MgO and an inner stone core of CaO. After removal from the fluidized bed combustion process, the sulfated and calcined dolomite particles are contacted with a flow of helium gas containing about 6% hydrogen by volume at a temperature of about 750° C. at about 1 atm pressure. Samples of stone periodically removed from this reduction process indicate a calcium sulfate to calcium sulfide mole ratio of about 1.5 after about 320 min. reaction time. The partially reduced stones are then heated in the presence of flowing helium gas substantially without hydrogen at a temperature of 950° C. for 60 minutes to provide a regeneration of 75% of the original sulfated calcium to calcium oxide. These regenerated particles are then ready to be returned to the fluidized bed combustion process for further sulfation. The $SO_2$ gas produced can be diverted to a separate vessel for recovery of S by the Claus process.

EXAMPLE II

The procedure for Example I is followed except limestone particles of mostly calcium carbonate are sulfated and calcined to particles having an outer layer of calcium sulfate and an inner core of calcium oxide. These particles are partially reduced at a temperature of 800° C. in a fixed bed with 4% hydrogen gas in helium for a period of 150 minutes. Subsequent heating in a fixed bed at 900° C. for 60 minutes is expected to produce an overall regeneration of about 60-70% at 1 atm pressure.

EXAMPLE III

The procedure of Example I is followed except that calcium oxide particles impregnated into porous alumina are sulfated within the fluidized bed combustion process and followed by partial reduction to calcium sulfide at 750° C. with a 6 volume % hydrogen in helium gas flow within a fluidized bed. Heating of these particles at 950° C. is expected to regenerate a major portion of the sulfated calcium to calcium oxide within the porous alumina substrate.

EXAMPLE IV

The method employed in Example III is used except that porous substrates of silica, titania and zirconia impregnated with the oxides of sodium, potassium, strontium, barium and magnesium are sulfated within a combustion process and regenerated.

EXAMPLE V

A synthetically prepared dolomite of $Mg_xCa_y(CO_3)_2$ is sulfated within a fluidized bed reactor to form $Mg_3Ca(SO_4)_4$ and $CaSO_4$. With this synthetic dolomite the magnesium salt is sulfated. This material is regenerated as in Example I to $Mg_xCa_y(O)_2$ for recycle to the fluidized bed combustion process.

Since there are a large variety of synthetic compounds resembling dolomites that can be prepared, it is reasonable to assume that the regeneration method of the present invention is also applicable to these oxides and carbonates.

EXAMPLE VI

After the sulfation and calcination of dolomite particles within a combustion process, the stones are contacted with a flow of 0.1 volume percent CO in nitrogen gas for about 20 hours at 950° C. to regenerate about 60% of the sulfated calcium to calcium oxide.

EXAMPLE VII

The procedure of example VI is followed except that the sulfated stones are originally reduced for one half hour at 750° C. with 3 volume % $H_2$ gas in He followed by a final period of about 10 hours in which a 0.05 volume % $H_2$ gas contacts the partially reduced stones at 950° C. to permit simultaneous gas-solid and solid-solid reduction reactions.

EXAMPLE VIII

The procedure of example VII is followed except that the sulfated stones are originally reduced for about 5 minutes at 950° C. with 1 volume % $H_2$ gas in He followed by a period of about 15 minutes in which the particles are just heated. Such a cycle is then repeated four times to allow the reaction of calcium sulfate to approach completion.

EXAMPLE IX

The procedure of example VI is followed except that the sulfated stones are originally reduced for 20 minutes at 850° C. with 4 volume % $H_2$ in He. The temperature is then raised to 950° C. without $H_2$ gas contact and the stones are heated for a period of 15 minutes. The temperature is then lowered to 850° C. where the stones are again contacted for 20 minutes with 4 volume % $H_2$ in He; then, the temperature is raised to 950° C. where stones are heated for 15 minutes. Three such cycles are expected to bring about the reaction of most of the calcium sulfate.

It is therefore clear that the present invention provides a method for regeneration of sulfated metal oxides and metal carbonates that have been employed for the absorption or taking up of sulfur oxide gases emitted in combustion processes. The process permits acceptable levels of regenerations by solid-solid reaction that have previously been considered as not preceding to a sufficient degree of completion. The process proceeds at somewhat lower temperatures than that required for other processes which attain comparable regeneration levels.

The embodiments of the invention in which an exclusive property or privilege is claimed are defined as follows:

1. A process for the regeneration of sulfated calcium oxide comprising contacting at a temperature of about 700°-800° C., solid particles containing calcium sulfate and calcium oxide with a reductant gas at a concentration of 2% to 8% by volume within an inert diluent gas to react with only a portion of said solid calcium sulfate and thereby produce solid calcium sulfide in intimate mixture with remaining calcium sulfate; and subsequently contacting said particles at a temperature of 900°-1000° C. with a reductant gas of not more than 0.1 volume % within said inert diluent gas to further reduce calcium sulfate to calcium sulfide in a neutral to slightly reducing atmosphere while simultaneously reacting said solid metal sulfate with said solid metal sulfide within said particles to produce $SO_2$ gas and regenerated calcium oxide.

2. The process of claim 1 wherein said reductant gas is in contact with said particles until a sulfate to sulfide ratio of about 1.0 to 2.0 is established and heating said particles to said second temperature.

3. The process of claim 1 wherein solid particles containing calcium sulfate and calcium oxide are contacted with a gas of about 6% by volume hydrogen gas at about 750° C. to provide a calcium sulfate to calcium sulfide ratio of about 1.5; and heating said particles at a temperature of about 950° C. out of contact with said hydrogen gas to react the calcium sulfide with the calcium sulfate in the solid particles and produce evolved sulfur dioxide gas and regenerated calcium oxide.

4. A process for the regeneration of sulfated calcium oxide comprising contacting solid particles containing calcium sulfate and calcium oxide at a temperature of about 750°-800° C. with a gas mixture consisting of not less than 6 volume % reductant gas and a major proportion of an inert diluent gas to provide a calcium sulfate to calcium sulfide ratio of about 1 to 2; subsequently contacting the solid particles at 900°-1000° C. with a reductant gas of not more than 0.1 volume % in an inert diluent gas for maintaining a neutral to slightly reducing atmosphere while simultaneously reacting the calcium sulfide with calcium sulfate to form solid calcium oxide and sulfur dioxide gas.

5. The process of claim 4 wherein a calcium sulfate to calcium sulfide ratio of about 1.5 is provided by heating the particles containing calcium sulfate and calcium oxide in contact with a gas mixture consisting of not less than 6% by volume reductant gas and a major proportion of an inert diluent gas at about 750° - 800° C.

* * * * *